United States Patent [19]
Sandor et al.

[11] Patent Number: 5,519,794
[45] Date of Patent: May 21, 1996

[54] COMPUTER-GENERATED AUTOSTEREOGRAPHY METHOD AND APPARATUS

[75] Inventors: Ellen R. Sandor; Stephan B. Meyers, both of Chicago, Ill.

[73] Assignee: Rotaventure L.L.C., Chicago, Ill.

[21] Appl. No.: 222,546

[22] Filed: Apr. 1, 1994

[51] Int. Cl.$^6$ .......................... G06K 9/36; H04N 13/00; H04N 15/00
[52] U.S. Cl. .......................... 382/285; 382/296; 348/42; 348/43; 348/51
[58] Field of Search ................................ 382/41, 46, 285, 382/297, 296; 354/112, 114; 355/22; 348/42, 43, 46, 51, 57, 58

[56] References Cited

U.S. PATENT DOCUMENTS

| | | |
|---|---|---|
| 666,424 | 1/1901 | Ives . |
| 725,567 | 4/1903 | Ives . |
| 1,260,682 | 3/1918 | Kanolt . |
| 3,241,429 | 3/1966 | Rice et al. . |
| 3,250,173 | 5/1966 | Henry . |
| 3,259,499 | 7/1966 | Thommes . |
| 3,306,974 | 2/1967 | Cunnally . |
| 3,560,740 | 2/1971 | Tripp .......................................... 250/61 |
| 3,772,465 | 11/1973 | Vlahos et al. ........................ 178/5.2 D |
| 3,895,867 | 7/1975 | Lo et al. ..................................... 355/77 |
| 3,937,565 | 2/1976 | Alasia ...................................... 350/320 |
| 3,953,869 | 4/1976 | Wah Lo et al. ........................... 354/115 |

(List continued on next page.)

OTHER PUBLICATIONS

R. Guzik, "Current Technology in 3–D Electronic Displays," Electronic Imaging '88 Anaheim, California, (Mar. 30, 1988).
B. Saunders, "Stereoscopic Drawing by Computer–Is It Orthoscopic?", Appl. Opt. vol. 7, No. 8, pp. 1499–1504 (Aug. 1968).
"Phsolograms by (Art)™", catalog relating to an art exhibition conducted at Fermilab, Batavia, Illinois, between Nov. 11, 1987 and Jan. 6, 1988.
"Exhibition of Computer Art," ACM/SIGGRAPH Traveling Art Show 1985, p. 52 (1985).
T. Okoshi, "Three Dimensional Imaging Techniques," Academic Press, N.Y. (1976).
A. Ortony, "A System for Stereo Viewing," The Computer Journal, vol. 14, No. 2, pp. 140–144 (May 1971).
H. Ives, "A Camera for Making Parallax Panoramograms," J. Opt. Sci. Amer. 17, pp. 435–439 (Dec. 1928).
M. Neal, "More Than Science, More Than Art," IEEE Computer Graphics and Applications, pp. 3–5 (Nov. 1988).
H. Ives, "The Chromolinoscope Revised," J. Opt. Soc. Amer. 20, pp. 343–333 (Jun. 1930).
A. Marraud et gal., "Lenticular Sheet 3–D Pictures and 3–d Projections," SPIE vol. 212 Optics and Photonics Applied to Three–Dimensional Imagery, pp. 48–51 (1979).
A. Appel et al., "Computer Generation of 3D Pictures," IBM Technical Disclosure Bulletin, vol. 15, No. 3, pp. 834–839.
Kopshina, B. and Schultz, N., "Macintosh—Design to Production" 1995, p. 265.

*Primary Examiner*—Joseph Mancuso
*Assistant Examiner*—Bipin Shalwala
*Attorney, Agent, or Firm*—Crowell & Moring

[57] ABSTRACT

A method and apparatus for making autostereographic images wherein a computer is provided with a number of planar images in digital form, in a two-dimensional array of columns and rows of digital data. The columns are interleaved and rotated to form an interleaved and rotated image so that the interleaved columns of the rotated image are substantially unaligned with the rows and columns of the digital representation of this image. The digital representation of the image is rotated using an algorithm that is independent of resolution and number of input images. The resulting image is then output on a high resolution imaging device so that the columns of interleaving are substantially unaligned with both the direction of printing and the normal to direction of printing. The output from the high resolution imaging device is then placed in a registered relationship with a means for viewing selected ones of the input images, such as a lenticular or barrier screen.

70 Claims, 6 Drawing Sheets

U.S. PATENT DOCUMENTS

| | | | |
|---|---|---|---|
| 3,980,476 | 9/1976 | Wysocki | 96/1.1 |
| 4,037,533 | 6/1977 | Rapoport et al. | 101/211 |
| 4,120,562 | 10/1978 | Lo et al. | 350/130 |
| 4,132,468 | 1/1979 | Lo et al. | 353/7 |
| 4,158,501 | 6/1979 | Smith et al. | 355/77 |
| 4,259,905 | 4/1981 | Abiko et al. | 101/467 |
| 4,478,639 | 10/1984 | Smith et al. | 430/9 |
| 4,600,297 | 7/1986 | Winnek et al. | 355/22 |
| 4,650,282 | 3/1987 | Lo | 350/130 |
| 4,717,949 | 1/1988 | Eichenlaub | 358/3 |
| 4,719,615 | 1/1988 | Feyrer et al. | 369/284 |
| 4,780,867 | 10/1988 | Lind et al. | 369/100 |
| 4,800,407 | 1/1989 | Wah Lo | 354/114 |
| 4,814,826 | 3/1989 | Fritsch | 355/22 |
| 4,825,430 | 4/1989 | Halter et al. | 369/275 |
| 4,836,874 | 6/1989 | Foster | 156/209 |
| 4,852,075 | 7/1989 | Feyrer et al. | 369/100 |
| 4,853,769 | 8/1989 | Kollin | 358/88 |
| 4,896,314 | 1/1990 | Skiens et al. | 369/284 |
| 4,901,304 | 2/1990 | Lind et al. | 369/284 |
| 4,912,696 | 3/1990 | Feyrer et al. | 369/100 |
| 5,003,915 | 4/1991 | D'Amato et al. | 118/46 |
| 5,024,521 | 6/1991 | Zuchowski et al. | 352/86 |
| 5,113,213 | 5/1992 | Sander et al. | 355/22 |
| 5,121,343 | 6/1992 | Faris | 395/111 |
| 5,181,258 | 1/1993 | Nagao et al. | 382/28 |
| 5,266,995 | 11/1993 | Quadracci et al. | 355/77 |
| 5,276,478 | 1/1994 | Morton | 355/22 |
| 5,278,608 | 1/1994 | Taylor et al. | 355/22 |
| 5,279,912 | 1/1994 | Telfer et al. | 430/17 |
| 5,285,238 | 2/1994 | Quadracci et al. | 355/77 |
| 5,297,217 | 3/1994 | Hamilton, Jr. et al. | 382/41 |
| 5,302,989 | 4/1994 | Taguchi et al. | 354/112 |

5,519,794

COMPUTER-GENERATED AUTOSTEREOGRAPHY METHOD AND APPARATUS

COPYRIGHT

The appendices to this patent application contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

This invention relates to computer-interleaved barrier screen and lenticular autostereography.

2. Background of the Invention

The present invention is a modification of the autostereographic method and apparatus disclosed in U.S. Pat. No. 5,113,213, which is incorporated by reference herein (the '213 patent).

In the invention described in the '213 patent, the number of images and pitch of the resultant autostereogram are related to the resolution of the hardcopy output device by the following formula:

$$\text{pitch} = \frac{\text{resolution}}{\text{images}}$$

Where pitch is the number of lines per unit of the completed autostereogram, resolution is the number of pixels per unit available from the hardcopy output device, and images is the number of images in the autostereogram.

Since images must be an integer not less than 2, there are only a finite number of possible resolutions. For example, if a hardcopy output device has a resolution of 16 pixels/mm (406.4 pixels per inch), 13 images yields a pitch of 31.26 lines per inch. Twelve images yields a pitch of 33.87 lines per inch. Other pitches, such as 32 lines per inch, are then unavailable without changing the resolution of the hardcopy output device.

This is illustrated in simplified form in FIG. 1. FIG. 1 shows that a device having an output resolution of 15 pixels per inch, and a pitch of 3 lines per inch, requires 5 images. In FIG. 1, each pixel is labeled according to which image (image 1, 2, 3, 4 or 5) it represents.

This is a severe limitation, especially when it comes to working with lenticular material. Such material must be created to exactly match one of the pitches available on the desired hardcopy output device. This is far more expensive and time consuming than using available lenticular material, which is unlikely to match the available pitches.

A second limitation arises from the loss of resolution and light from the use of large numbers of images with a parallax barrier. Even in the ideal case, the barrier screen blocks (N−1) of the N images at each location. The more images that are used, the less light is transmitted. The percent of light transmitted by a barrier screen image is also related to the resolution of the hardcopy output device by the following formula:

$$\text{percent} = \left(\frac{1}{\text{images}}\right) \times 100$$

For 13 images, 7.7% of the light is transmitted by the barrier screen. This is an acceptable amount of light for most applications. However, if 100 images are required at the resolution discussed above, the pitch for 100 images would be 4.064 lines per inch, and the amount of light transmitted by the barrier screen would be only 1%, which is unacceptable. Because many applications, e.g. animation, require 100 or more images, this is an important limitation.

A third limitation of the invention disclosed in the '213 patent arises from the output of images having a selected edge of the interleaved images aligned with the printing direction of the hardcopy output device. Although in many cases aligning the image with either the rows or the columns of the image is advantageous, this may be a significant limitation in certain cases, e.g., if the number of images required for a particular application is different from the ratio of the resolution to the pitch, or if the desired pitch is not available according to the formula given above for the pitch in a '213-type autostereogram.

SUMMARY OF THE INVENTION

The present invention eliminates the linkage between the pitch, the number of images, and the resolution of the hardcopy output device. Eliminating this linkage allows for the production of autostereographic images with pitches previously unavailable, and allows for the use of a larger number of images at a given pitch.

The key step in the present invention is the rotation of the interleaved image with respect to the direction of printing and the direction of the digital representation. This rotation results in increased numbers of images per unit pitch, by trading vertical resolution for horizontal resolution. As shown by FIG. 2, rotating an image requires a larger available output image size, to accommodate space for the rotation. FIG. 2 uses the output device parameters of FIG. 1, i.e., a resolution of 15 pixels per inch and a pitch of 3 pixels per inch. However, the number of images shown in FIG. 2 is 10 (instead of the 5 images illustrated in FIG. 1). Each pixel is labeled with the image (1, 2, 3, 4, 5, 6, 7, 8, 9 or 10) that it represents. The 10 images are rotated at an angle of 53.13°.

In one embodiment of the present invention, the rotation is a step separate from the interleaving step. The images are first interleaved, as described in the '213 patent, and then the interleaved image is stored digitally for further processing. The interleaved digital image is then rotated to provide a second rotated and interleaved digital image. Generally, the rotated image is then scaled down to the desired size (i.e., to the desired number of pixels), since the interleaving should be made at a higher resolution than the resolution ordinarily available on the hardcopy output device. This scaling step is used to match a desired pitch. The scaling step is used so that interleaving can proceed at a higher pixel resolution than the resolution of the hardcopy output device. The high resolution interleaved image is scaled down to the appropriate output resolution after rotation, but retains the higher image count of the high resolution image.

In a second preferred embodiment of the present invention, the digital image is rotated and interleaved in a single operation on the computer.

The desired angle of interleaving may vary for different situations. In the case of image output as four-color separations for offset printing, the angle of interleaving should be selected as an angle which does not interfere with any of the four angles selected for printing each of the offset colors. In the case of other output devices, such as those capable of continuous tone output, the angle may be selected to allow a desired image to fit on the available output image size. It may also be selected to provide an optimum tradeoff between horizontal and vertical resolution.

A wide range of angles provide drastic improvements over the interleaving method disclosed in the '213 patent. Rotations by angles of 25°, 30° and 55° have been demonstrated to dramatically improve the horizontal resolution of the autostereograph. Because angles near 45° produce undesirable effects, the preferred ranges for the angle of interleaving are 10° to 35° and 55° to 80°.

The horizontal resolution of the autostereograph improves because many more images can be used to create a better three-dimensional effect, smoother animation, and more images in a multi-image display. For example, using the present invention an animation of 100 images was created at a pitch which would have only allowed 13 images if it had been created using the invention disclosed in the '213 patent. The present invention has also been used to match the pitch of an existing lenticular screen, with more images than can be practically obtained with optical methods. For practical reasons, the upper bound to the number of images that can be used for a given pitch and angle of rotation is likely to be:

$$\text{upper bound} = \left(\frac{\text{resolution}}{\text{pitch}}\right)^2$$

For example, at a resolution of 406.4 pixels per inch and a pitch of 31.26 per inch, the upper bound would be approximately 169 images. The lowest practical resolution of the output device is about 100 pixels per inch; devices with resolutions of 1,000 to 3,000 pixels per inch are also available. For example, the present invention has been implemented using a Kodak LVT, which has a resolution of approximately 2,000 pixels per inch. Use of output devices having a resolution of 300 pixels per inch is recommended.

DETAILED DESCRIPTION OF PREFERRED EMBODIMENTS OF THE INVENTION

Figure 1:
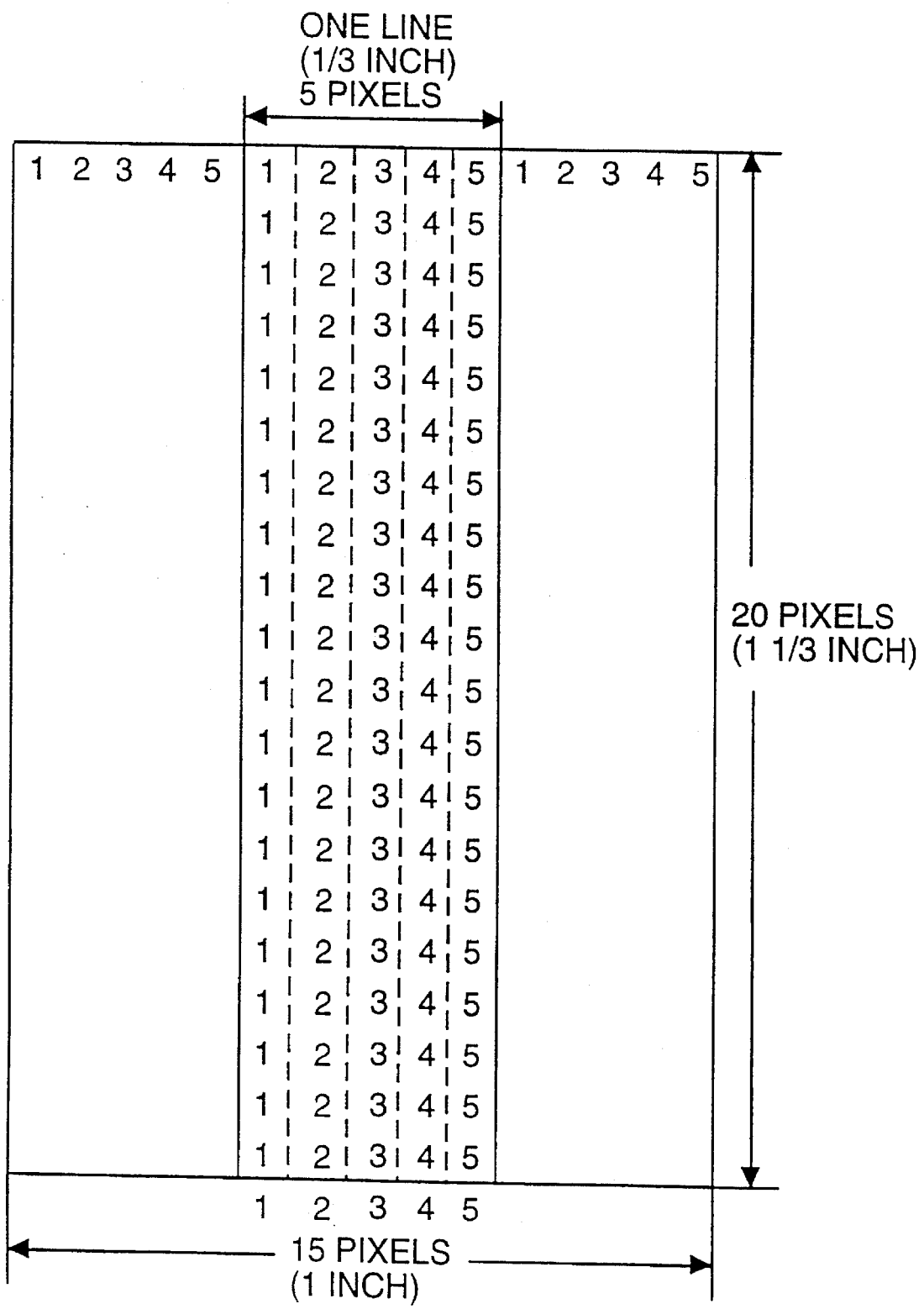
FIG. 1 is a schematic diagram illustrating the requirement imposed by the resolution and pitch of the output device on the number of images that can be interleaved.
Figure 2:
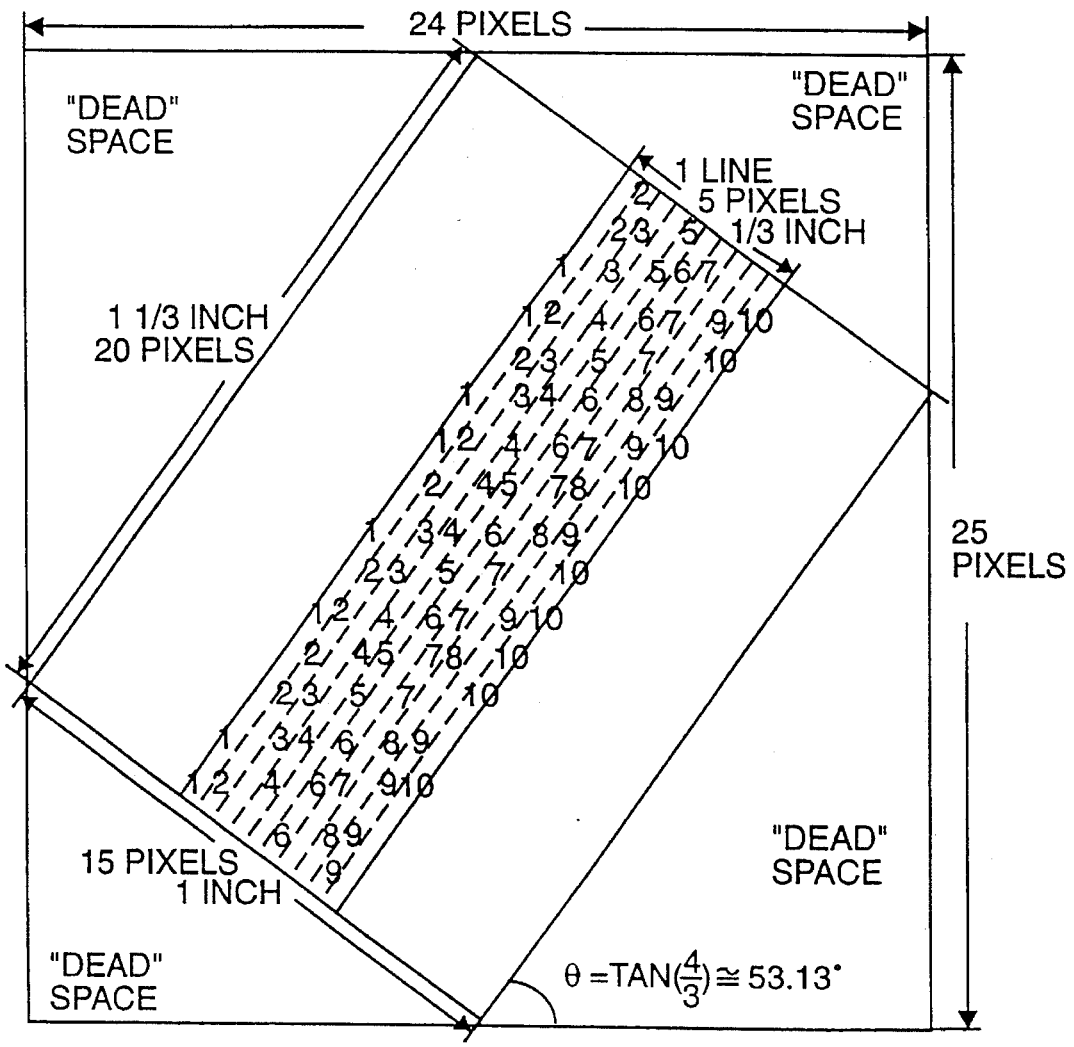
FIG. 2 is a schematic diagram illustrating rotation of the interleaved image of FIG. 1.
Figure 3:
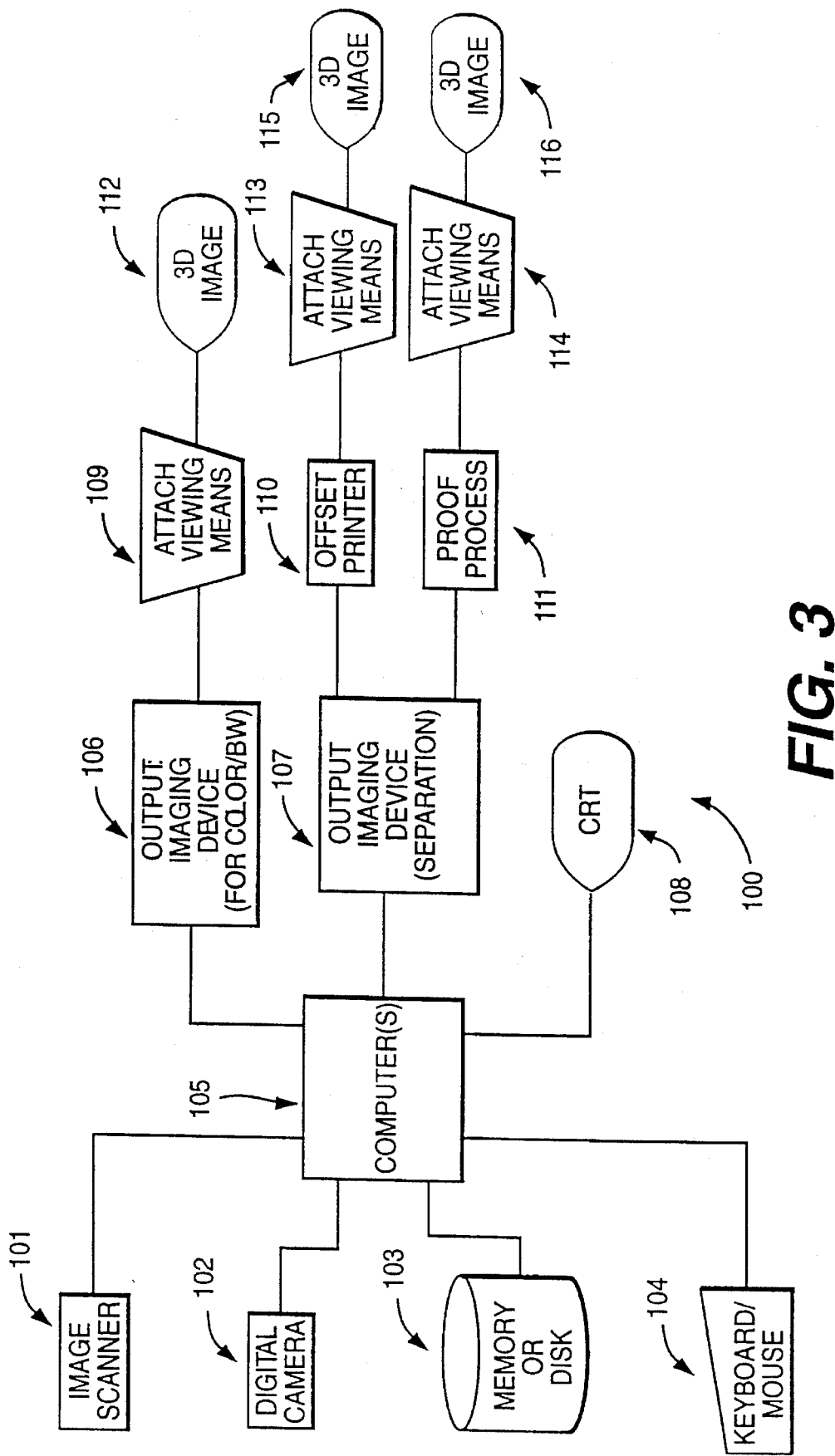
FIG. 3 is a schematic diagram of the apparatus of the present invention.

FIG. 3 is a block diagram of the present invention. Apparatus 100 comprises one or more computers 105, which accept digital inputs from at least one of input device 104 (a keyboard or a mouse), memory 103 (hard disk, a floppy disk, tape or other type of memory), digital camera or video frame digitizer 102 for directly providing digital images, and image scanner 101 for converting hard copy, such as positive or negative film transparencies or prints, or other images into digital images.

Any suitable means for inputting data into computer 102 may be employed in apparatus 100. For example, a suitable digital camera is the Logitech Photoman (available from Logitech, Mountain View, Calif.), and a suitable scanner is the Epson ES-600C scanner.

Computer 105, e.g., an Indigo 4000 computer available from Silicon Graphics Corporation, is used to manipulate the input digital images to produce a digital representation of interleaved planar images.

The output of computer 105 is then directed to a suitable high resolution full color, gray scale, or black and white output imaging device 106, and/or a suitable high resolution halftone output imaging device 107, e.g., the Kodak model LVT. A suitable halftone output device is the model 6461E Expose Unit Laser scanner manufactured by Crosfield Electronics, Inc.

The color separations produced by the halftone output imaging device 107 are then used to create a full color image. This may be done by making plates from the separations and printing an image on an offset printer 110, or by making a proof from the separations using a proof process 111, such as Dupont Chromolin™ or Matchprint™.

Figure 4:
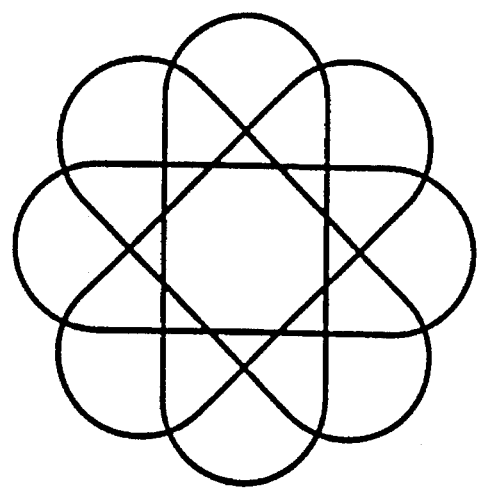
FIG. 4 is a schematic diagram of the overlapping dots produced by a four color scanner.

Halftone dots are laid down by the scanner at different angles and varying sizes for different colors, the intersections of which form a rosette pattern. It should be understood that the angles and spacing of the dots have been carefully chosen by the scanner manufacturers to minimize moirés with one another. As illustrated in FIG. 4, a typical four color scanner such as the Crosfield device (in its elliptic dot mode) forms images comprising overlapping dots corresponding to yellow 30, magenta 32, cyan 34, and black 36. Although illustrated for clarity as being disposed at mutual angles of 45°, the angles between the magenta 32 and cyan 34 dots and the yellow dot 30 are actually 15° and the black dot 36 is at an angle of 30° with respect to the magenta or cyan dots.

It is important to note that, when producing images intended for halftone output and production, such as for a printing press, the lines of interleaving effectively form a fifth color. When the pitch of interleaving is close to the pitch of the halftone screen and a lenticular or barrier screen is applied to the printed image, a moiré may result between the lenticular or barrier screen and one or more of the halftone colors. This effect may be eliminated or minimized in one of three ways.

The first way to minimize or eliminate moiré is to select the angle of interleaving specifically so as to not interfere with the angles of the four colors. In the case shown in FIG. 4, for example, the angle of interleaving could be selected to be 15° with respect to the black and magenta angles. Any angle of interleaving may be selected in order to minimize or eliminate the effect of moiré, and the required angle may be different from case to case due to image content, pitch, and other factors.

The second way to minimize or eliminate moiré is to select the angles of the four colors to not moiré with the desired angle of interleaving. This may not be possible on all halftone output devices, but if the output device supports variable halftone angles, this approach may be advantageous. It is obvious, and even more advantageous, that the halftone angles and angle of interleaving may be mutually selected to minimize or eliminate problems with moiré.

The simplest solution is to eliminate the color angles entirely. This may be done by the use of random dot screening, also referred to as stochastic screening. In this process, which is described in U.S. Pat. Nos. 4,037,533 and 4,259,905, which are incorporated by reference herein, halftone color separations are produced with a random screen which has no halftone angles whatsoever, and thus cannot cause a moiré problem.

As shown in FIG. 3, computer 105 may also output information to a suitable CRT monitor 108 that enables the interactive manipulation of data input to computer 105.

The raw output of interleaved images must then be attached to a means for viewing, e.g., devices 109, 113, 114 of FIG. 3. The means for viewing may be a lenticular screen, a parallax barrier, or a line light source as described in U.S. Pat. No. 4,717,949 (which is incorporated by reference herein), a holographic optical element, or other means for viewing. The means for viewing may be affixed to the front of the raw output or, in the case of the line light source, to the rear of the raw output. The means for viewing may be affixed in a variety of manners known in the art, including, but not limited to, manual registration and lamination and automatic registration and lamination.

The step of attaching the viewing means may be combined with the step of producing the output image by directly printing the image onto a suitable means for viewing, such as a lenticular or barrier screen, or by printing a barrier screen on the reverse side of a transparent substrate from the image, either using a double-sided output imaging device, or by offset printing on both sides of the substrate. When printing a barrier screen on the reverse of a substrate, the barrier screen must have sufficient density to block light and produce the barrier screen effect, and the substrate must have sufficient thickness to produce the depth effect. Whether using a double-sided output imaging device or offset printing, a means for either registering the image to the means for viewing or registering the means for viewing to the image must be provided. This may be provided by alignment of an edge of the substrate material, sprocket holes, optical sensing devices, or other means.

Typical pitches of lenticular screens used with the present invention are 135/inch and 80/inch. Typical pitches of barrier screens used with the present invention are 31/inch, 45/inch, 60/inch and 80/inch. Typical thicknesses of the substrate are 0.250 inches, 0.0625 inches and 0.03125 inches.

Algorithms

The following is an example of a first algorithm that can be used to implement the second preferred embodiment of the present invention, by rotating and interleaving images in a single operation in the computer. Pseudocode for implementing this algorithm is included herein at Appendix I. A computationally more optimal rotation algorithm, which makes use of vector mathematics and the consistency of direction of computation due to the angle of interleaving, is included herein, in Appendix II. The Appendix II algorithm alleviates the need for expensive computation of rotation (which would otherwise have to be computed using trigonometric functions). However, the present invention is more readily explained with respect to the algorithm of Appendix I.

The present invention is not limited to methods which implement either the algorithm of Appendix I or the algorithm of Appendix II. One skilled in the art would readily recognize that image rotation can be accomplished using any of a wide range of different computational techniques.

The algorithm of Appendix I computes the size $(X_{os}, Y_{os})$ of the digital representation of the output image and allocates the needed storage in the computer, given a desired output image size $(X_s, Y_s)$ and a desired rotation angle $\theta$. FIGS. 5a–5d define the parameters used in the algorithm.

Figure 5A:
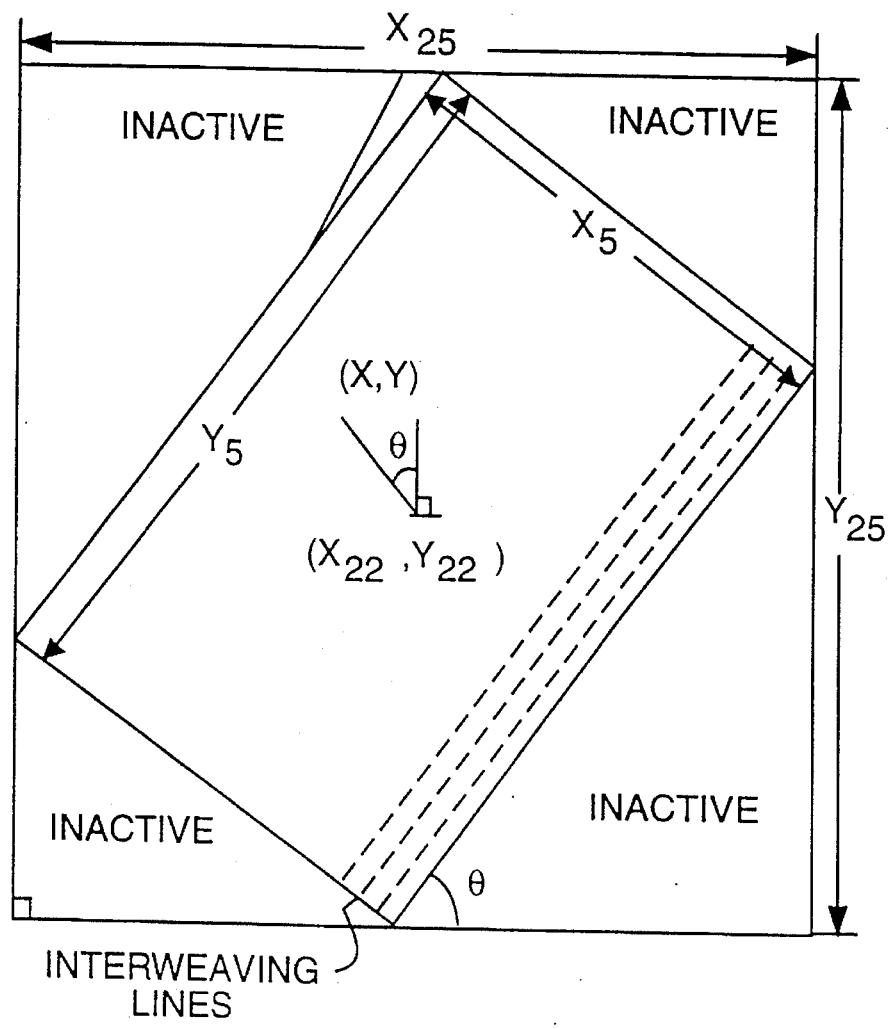
FIGS. 5a–5d define the parameters used in the algorithm of Appendix I.

In FIG. 5a:

$X_{OS}$ and $Y_{OS}$ are the horizontal size and vertical size, respectively, of the output image needed to hold the rotated image.

$X_S$ and $Y_S$ are the horizontal size and vertical size, respectively, of the image.

$(X_{OC}, Y_{OC})$ is the center of the output image.

$(X, Y)$ is the current pixel in the output image.

$\theta$ is the angle of the interleave.

$\phi$ is the angle to the current pixel from the output vertical.

Thus we have:

$$X_{OS} = \sqrt{(X_S^2 + Y_S^2)} \; \cos\left(\tan^{-1}\left(\frac{Y_s}{X_S}\right) + \theta\right)$$

$$Y_{OS} = \sqrt{(X_S^2 + Y_S^2)} \; \sin\left(\tan^{-1}\left(\frac{Y_s}{X_S}\right) + \theta\right)$$

$$\phi = \tan^{-1}\left(\frac{Y - Y_{OC}}{X - X_{OC}}\right)$$

Figure 5B:
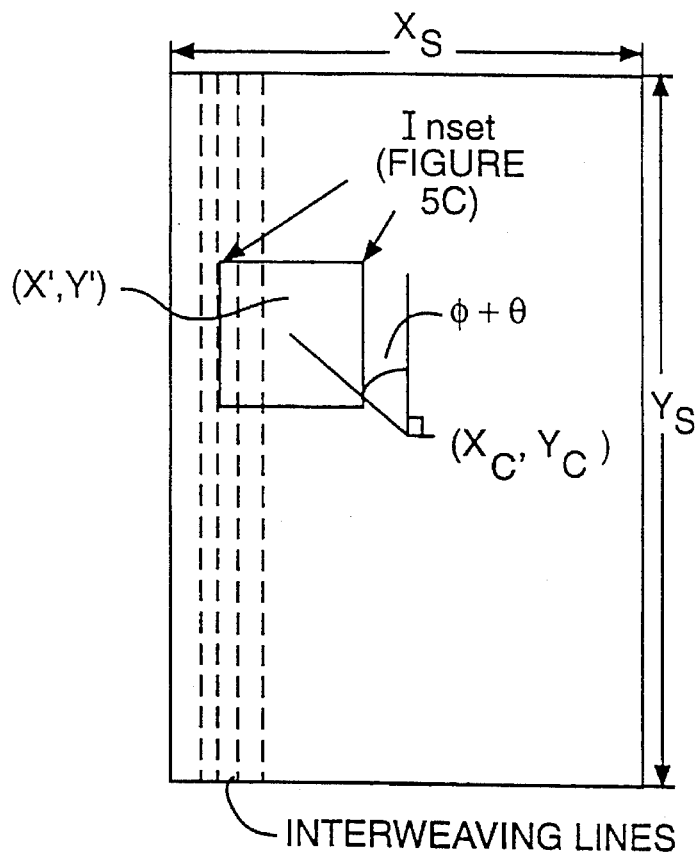

FIG. 5b shows an example of the interleaved but unrotated image. In the preferred embodiment of the invention, this image is an abstraction, and is never actually created. In FIG. 5b:

$X_S$, $Y_S$, $\theta$ and $\phi$ were defined above with respect to FIG. 5a.

$(X_C, Y_C)$ is the center of the interleaved image $(X', Y')$ is $(X, Y)$ transformed by rotation into interleaved image space.

Figure 5C:
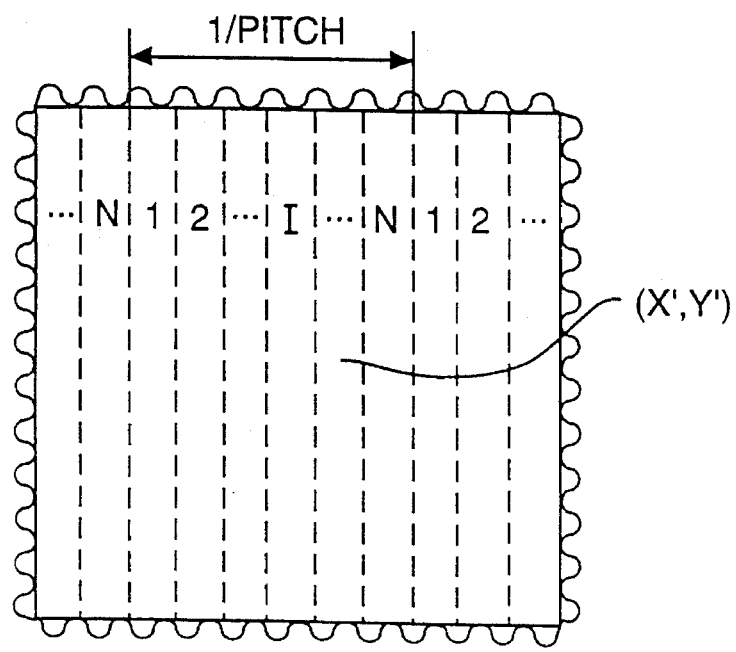

FIG. 5c is a detail from FIG. 5b. In FIG. 5c:

Pitch is the number of lines per unit distance.

1, 2, ... I ... N is an indication of the image in that column.

N is the number of images.

I is the current image for a given pixel, $1 \leq I \leq N$.

$(X', Y')$ is defined in FIG. 5b.

The dashed line in FIG. 5c indicates a group repeat line. The dashed-dotted line in FIG. 5c indicates an image line boundary.

Figure 5D:
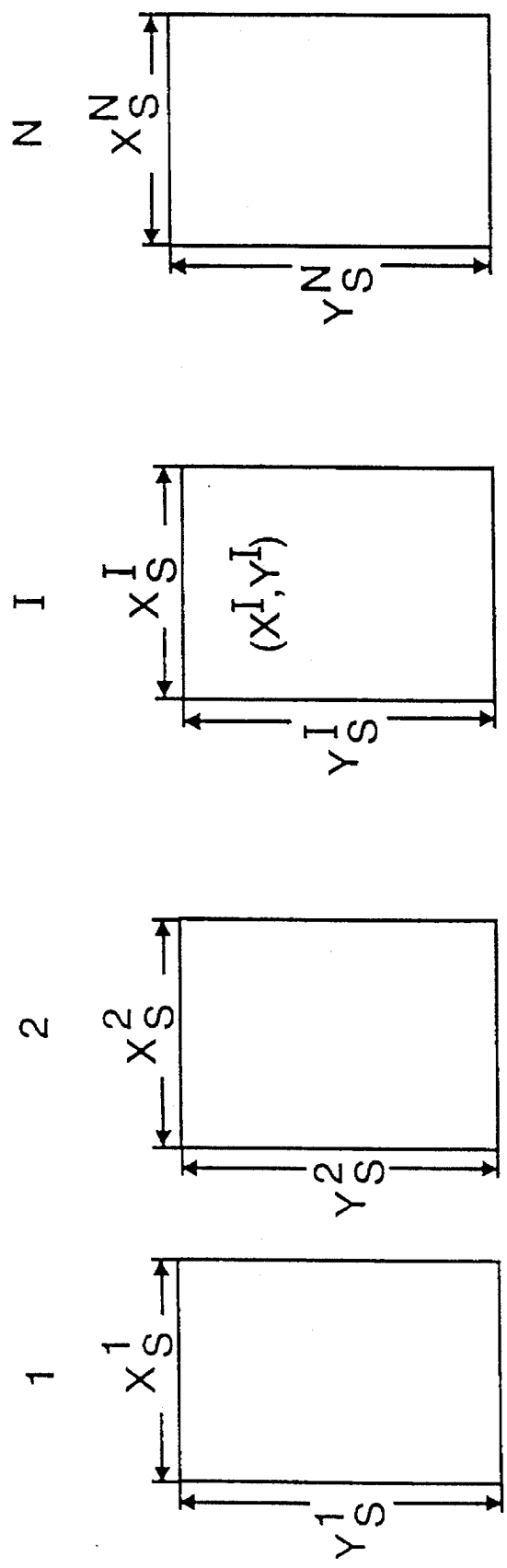

FIG. 5d shows individual images schematically. In FIG. 5d:

$(X^I, Y^I)$ is the desired pixel in image I.

The selection of the image at a current X in the interleaved image:

$$I = \text{INTEGER}\left(\frac{x' \text{ MOD PITCH}}{\text{PITCH}} \times N\right)$$

The X position is scaled in the interleaved image in relation to the individual image:

$$X^I = \left(\frac{X'}{X_S}\right) X_S^I$$

The Y position is scaled in the interleaved image in relation to the individual image:

$$Y^I = \left(\frac{Y'}{Y_S}\right) Y_S^I$$

The size $(X_{os}, Y_{os})$ of the digital representation of the output image is greater than the desired output image size because the digital representation must have "dead space" in the corners to allow for the rotation of the image. For each of the pixels in the output image, take the (X,Y) coordinate of that pixel and rotate it by θ around the center of the output image $(X_{oc}, Y_{oc})$. If the new location (X',Y') is not in the active image area—i.e., if it does not lie within the rectangle of size $(X_s, Y_s)$, set the color of the pixel to a color representing unused image area (generally, either black or white). If the new location falls within the rectangle, determine the image to which that pixel belongs, by finding the horizontal position of that pixel relative to the edge of the nearest repetition of the pitch of interleaving. This is computed by taking the remainder of dividing the X position by the inverse of pitch. The remainder represents the horizontal position of the pixel within the line. Dividing this remainder again by the inverse of the pitch yields a real number between 0 and 1 (inclusive of 0, exclusive of 1). Multiplying this number by the number of images and retaining only the integral part provides the image number of that pixel.

For example, to create an image 10 inches wide, with a pitch of 100 lines per inch, with 8 input images, the image represented in a pixel having the position 10.003 horizontally is obtained by:

(1) Dividing 10.003 by the inverse of the pitch (0.01) to obtain a quotient of 1000 and a remainder of 0.003;

(2) Dividing the remainder (0.003) by the inverse of the pitch again, to obtain the ratio 0.3;

(3) Multiplying this ratio (0.3) by the number of images (8) to obtain 2.4;

(4) The integral part of 2.4 is 2; this represents image number 3 (since the first image is assigned to 0).

The position of a pixel in the planar image corresponding to the position in the output image is then determined, and then the pixel in the output image is set equal to the value of the pixel at the corresponding position in the selected planar input image. This process is continued for all of the pixels in the output image.

This algorithm has two significant advantages over prior art algorithms: (1) it is independent of the resolution, and (2) it is independent of the number of images. Moreover, this algorithm adjusts automatically to the size and number of the input images.

There are two important variations on this algorithm. First, anti-aliasing may be achieved by supersampling each pixel of the output image, by computing an average of several subpixels within each output pixel. This increases the computation time for the algorithm, but may provide a better image, especially when combined with the use of a continuous tone hardcopy output device. Second, the value of a given pixel in the input planar images may be computed by interpolating values in-between the provided images. This latter change can greatly enhance the quality of the final image at a very modest decrease in speed.

APPENDIX I: FIRST PSEUDOCODE IMPLEMENTATION OF THE ALGORITHM FOR THE SECOND PREFERRED EMBODIMENT

Input: N images of sizes $(X^{1s}, Y^{1s})...(X^{Ns}, Y^{Ns})$

Desired output size $(X_s Y_s)$

Desired pitch P

Desired angle of interleaving $\theta$

- Compute the required size of the output image $(X_{os}, Y_{os})$ and allocate storage

- For each (X,Y) in the output image

- If (X'Y') is in the active image area:

$$I = int(\frac{X \bmod P}{P} N) + 1$$

$$X^I = (\frac{X'}{X_s}) X_s^I$$

$$Y^I = (\frac{Y'}{Y_s}) Y_s^I$$

- Set pixel value of $(X,Y) = (X^I Y^I)$

- Else

- Set pixel value of (X,Y) to inactive (usually black)

- Output finished image

APPENDIX II: SECOND PSEUDOCODE IMPLEMENTATION OF THE
ALGORITHM FOR THE SECOND PREFERRED EMBODIMENT

```
* C++ of best implementation for
*
* IMPROVED COMPUTER-GENERATED AUTOSTEREOGRAPHY METHOD AND
  APPARATUS
*
* C++ is an object oriented language, allowing the definition of
* new data types.  Two data types are used here, Vector and
* Pixel.  The usage of these data types follows, for the most
* part, conventional understanding of vectors and pixels.
*
* Vectors are two-dimensional, may be initialized to a value or
* to a unit vector at a given angle.  They may be added, and
* subtracted.  They may be multiplied or divided by a constant.
* Their components X and Y are available.
*
* Pixels are intentionally left undefined, since they may have
* any number of components, which include but are not limited
* to:
* Binary values, grey values, RGB values, CMYK values, alpha
* channel, Z buffer, or other integer or floating point values.
*
* Y generally refers to rows and X to columns
*
* Input variables: (units are usually, but need not be, inches)
* resolution  - pixels per unit of the output device
* xs, ys - desired output size in units
* outxs, outys    - required output size considering rotation
* in units
* pitch   - lines per unit
* angle   - angle of rotation in degrees
* ss      - number of samples in each direction to supersample
*/

// SQR is a macro which returns the square of the given value
#define SQR(n) ((n)*(n))

int interleave(double resolution, double xs, double ys,
        double outxs, double outys, double pitch, double angle,
int ss) {

/*
     * Convert each input measured in units into pixels
     */
    xs *= resolution;
    ys *= resolution;
    outxs *= resolution;
    outys *= resolution;
    pitch = resolution/pitch; // pitch is now measured in pixels
```

```
/*
 * Find the vector which points to the start of scanning,
 * and a unit vector pointing "up"
 * and a unit vector pointing "right"
 * in the virtual space
 */
// initialize start vector to lower left of output
Vector start = Vector(-outxs/2, -outys/2);
start = start.rotate(angle DEG); // rotate by angle degrees
Vector right = Vector(0 DEG); // unit vector pointing to the
                right
right = right.rotate(angle DEG); // rotate by angle degrees
Vector up = Vector(90 DEG);      // unit vector pointing up
up = up.rotate(angle DEG);       // rotate by angle degrees /*
 * Allocate a buffer for a single output scanline
 */
Pixel *outline = new Pixel[outxs];

/*
 * Step through each line of the output image, from the
 * bottom up.
 * For each line, start by initializing a vector which points
 * to the current pixel position in the virtual unrotated
 * image to the start position plus y times the up vector,
 * meaning one step up for each line
 */
for(int y=0 ; y<outys ; y++) { // step through each line
  Vector current = start+y*up;  // set current pixel to start
                vector plus y up steps /*
    * Step through each column of the current line.
    * In each column, increment the vector pointing to the
    * curent pixel position in the virtual unrotated image
    * by a single step to the right.
    */
   for(int x=0 ; x<outxs ; x++, current=current+right) { //
           step through each column
      /*
       * Check for supersampling. If there is none, set the
       * current output pixel each to the value of the pixel
       * pointed to by the current vector.  Otherwise, compute
an average of subpixels within the current pixel by adding
fractions of the unit vectors to the current pixel, finding
subpixel positions
       */
      if(ss=1) // if there is no supersampling
        outline[x] = PHSCpixel(pitch/xs, current.x/xs+.5,
        current.y/ys+.5, xs, ys);
        else { // if there is supersampling
          Pixel total = Pixel(); // initialize the sum to 0
```

```
            /*
             * Step through the supersampled subpixels using the
             * same vector method used in the outer loops.
             */
            for(int ssy=0 ; ssy<ss ; ssy++) {
                Vector subcurrent = current+ssy*(up/ss);
                for(int ssx=0 ; ssx<ss ; ssx++,
                  subcurrent=subcurrent+(right/ss)) {
                    total+=PHSCpixel(pitch/xs, temp.x/xs+.5,
                    temp.y/ys+.5, xs, ys);
                } // end subsampling x (column) loop
              } // end subsampling y (row) loop
            // Divide the sum of the subpixels by the number of
              samples outline[x]=total/SQR(ss);
          } // end if subsampling
      } // end x (column) loop
      /*
       * outline now contains a complete output scan line.
       * Write it to the output device, which may be, but is not
       * limited to, a tape, an image file, an output imaging
       * device, or the CRT.
       */
      Write_Output_Line(device, outline, outxs);
    } // end y (row) loop delete outline; // free up allocated memory
  } // end rotated interleaving /*
 * This subroutine returns the value of the pixel at a given
 * location in a an unrotated PHSCologram, given the
 * x and y positions of the pixel, the pitch in
 * pixels, and the x and y sizes of the
 * It is assumed that the desired xsize (xs) and ysize (ys) of
 * the output
 */
PHSCpixel(double pitch, double x, double y, double xs, double ys)
{
    // Scale the x and y positions to fractions of the total size
    x /= xs;
    y /= ys;
    // Scale the pitch to a fraction of the x size
    pitch /= xs;
    // add one half pixel to x and y to point to a pixel center
    x+=.5;
    y+=.5;

/*
     * Check to see if the current pixel actually lies _inside_
     * the desired output area.  If it does not, then return
     * a null pixel (defined as black)
```

```
    */
    if(x<0 || x>=1 || y<0 || y>=1) {
     Pixel null = Pixel();
     return null;
    }

/*
     * Find the image corresponding to this pixel.
     * The definition of fmod from the Silicon Graphics online
     * manuals:
     *
    fmod returns the floating-point remainder of the division of
its double arguments x by y.  It returns zero if y is zero or if
x/y would overflow; otherwise the number f with the same sign as
x, such that x = iy + f for some integer i, and |f| < |y|.
     *
     */
    int N = (int)(fmod(x, pitch)/pitch*NumImages);

/*
     * The routine "pixel" returns the value of a pixel from the
     * desired image,  given the image number N, and the x and
     * y positions,  with 0<=x<1 and 0<=y<1
     * pixel interpolates actual pixel values to find inbetween
     * pixel values.  It also scales the x and y values
     * to the actual pixel count, accounting for cropping.
     */
    return pixel(N, x, y);
}
```

What is claimed is:

1. A method for making autostereographic images, comprising the steps of:

(a) inputting a predetermined number of planar images into a computer;

(b) interleaving the predetermined number of planar images in the computer to produce a digital representation of an interleaved image, said digital representation having rows and columns;

(c) rotating the digital representation of the interleaved image in the computer by a predetermined angle of interleaving such that a selected edge of the rotated interleaved image is substantially unaligned with the original direction of the digital representation prior to rotation;

(d) printing the rotated interleaved image with a high-resolution output imaging device, such that a selected edge of the rotated interleaved image is substantially unaligned with the printing direction of said output imaging device and also substantially unaligned with the normal to said direction; and (e) positioning the output from the high-resolution output imaging device in a registered relationship with a means for viewing.

2. The method of claim 1, wherein each of the predetermined number of planar images is a view of a scene from one of a predetermined number of different viewpoints.

3. The method of claim 1, wherein each of the predetermined number of planar images is a view of a scene from one viewpoint, taken at a predetermined number of different times.

4. The method of claim 1, wherein each of the planar images are unrelated.

5. The method of claim 1, wherein each of the predetermined number of planar images is input to the computer using an input scanning device.

6. The method of claim 1, wherein each of the predetermined number of planar images is rendered within the computer from a three dimensional description of a scene.

7. The method of claim 1, wherein each of the predetermined number of planar images is created within the computer by an operator.

8. The method of claim 1, wherein each of the predetermined number of planar images is input to the computer by one or more digital cameras in direct communication with the computer.

9. The method of claim 1, wherein the steps of interleaving the planar images and rotating the interleaved image comprise substantially a single operation on the computer.

10. The method of claim 1, further comprising the additional step of scaling the image after step (c) and before step (d).

11. The method of claim 10, wherein the image is scaled up.

12. The method of claim 10, wherein the image is scaled down.

13. The method of claim 10, wherein the steps of interleaving, rotating and scaling the image comprise substantially a single operation on the computer.

14. The method of claim 1, wherein the angle of interleaving is between 10° and 35°.

15. The method of claim 14, wherein the angle of interleaving is approximately 30°.

16. The method of claim 1, wherein the angle of interleaving is between 50° and 80°.

17. The method of claim 16, wherein the angle of interleaving is approximately 55°.

18. The method of claim 1, wherein the high-resolution output imaging device has a resolution between approximately 100 and 3,000 pixels per inch.

19. The method of claim 18, wherein the high-resolution imaging output device has a resolution of 300 pixels per inch.

20. The method of claim 18, wherein the high-resolution output imaging device has a resolution of 1,000 pixels per inch.

21. The method of claim 1, wherein the high-resolution output device has a resolution of 1,000 pixels per inch.

22. The method of claim 1, wherein the high-resolution output device comprises means for making color separations and means for making a color image from the color separations.

23. The method of claim 22, wherein the means for making a color image from the color separations comprises one of a web printing press and a sheet-fed printing press.

24. The method of claim 22, wherein the means for making a color image from the color separations comprises a proof process.

25. The method of claim 24, wherein the proof process comprises contact printing in multiple passes onto color film.

26. The method of claim 22, wherein the angle of interleaving is selected so as not to cause a moiré with any of the four printing angles.

27. The method of claim 22, wherein the four printing angles are selected so as not to cause a moiré with the angle of interleaving and so as not to cause a moiré with one another.

28. The method of claim 22, wherein the device for making color separations uses a screenless printing process.

29. The method of claim 22, wherein the device for making color separations uses a random screening process.

30. The method of claim 1, wherein the output device is a continuous tone full color output device.

31. The method of claim 1, wherein the means for viewing comprises a lenticular screen whose pitch matches the pitch of interleaving.

32. The method of claim 31, wherein the pitch of the lenticular screen is approximately 135 lines per inch.

33. The method of claim 31, wherein the pitch of the lenticular screen is approximately 80 lines per inch.

34. The method of claim 31, wherein the pitch of the lenticular screen is slightly greater than the pitch of the image, so as to provide for parallax correction.

35. The method of claim 1, wherein the means for viewing comprises a barrier screen, whose pitch matches the pitch of interleaving, and a transparent spacer.

36. The method of claim 35, wherein the pitch of the barrier screen is approximately 31 lines per inch.

37. The method of claim 35, wherein the pitch of the barrier screen is approximately 80 lines per inch.

38. The method of claim 35, wherein the transparent spacer is a transparent material.

39. The method of claim 35, wherein the transparent spacer is one of an air gap, a vacuum gap and a gas gap.

40. The method of claim 35, wherein the pitch of the barrier screen is slightly greater than that of the image, so as to provide for parallax correction.

41. The method of claim 1, wherein the means for viewing comprises a light line source.

42. The method of claim 41, wherein the pitch of the line light source is slightly less than the pitch of the image.

43. An apparatus for making images, comprising:

(a) means for generating a predetermined number of planar images;

(b) a computer, said computer comprising means for interleaving the predetermined number of planar images to produce an interleaved image;

(c) means for rotating a digital representation of the interleaved image in the computer by a predetermined angle of interleaving such that a selected edge of the rotated interleaved image is substantially unaligned with the original direction of the digital representation prior to rotation;

(d) a high resolution output imaging device in communication with the computer, said output imaging device having a printing direction and comprising means for printing the rotated interleaved image on a substrate with a selected edge of the rotated interleaved image being substantially unaligned with both the printing direction and the normal to said printing direction; and (e) means for attaching the rotated interleaved image output by the output imaging device to a means for viewing selected ones of the planar images.

44. The apparatus of claim 43, wherein the means for generating planar images comprises a scanner in communication with the computer.

45. The apparatus of claim 43, wherein the means for generating planar images comprises a computer program whereby an operator can create planar images.

46. The apparatus of claim 43, wherein the generating means comprises a computer program which can accept as input one or more views of a scene and can automatically generate a plurality of different planar views of the scene.

47. The apparatus of claim 43, wherein the generating means comprises a number of digital cameras in direct communication with the computer.

48. The apparatus of claim 47, further comprising a single camera mounted on a moving track for providing a series of planar images from the predetermined number of predetermined viewpoints.

49. The apparatus of claim 43, wherein the generating means comprises a single camera for providing a series of images of a scene taken at the predetermined number of predetermined times.

50. The apparatus of claim 43, wherein the means for rotating the interleaved image is the computer.

51. The apparatus of claim 43, wherein the substrate comprises a lenticular sheet, with the lenticles formed on the side of the lenticular sheet opposite to the side having the printed image thereon, the printed image being in registration with the lenticles, and wherein the means for printing the interleaved image comprises means for attaching the printed image to the lenticular sheet.

52. The apparatus of claim 43, wherein the substrate comprises a transparent spacer with a barrier screen formed on the side of the spacer opposite to the printing, the printing occurring in registration with the barrier screen, and wherein the means for forming the image comprises means for attaching the printed image to the substrate.

53. An apparatus for making images, comprising:

(a) means for generating a predetermined number of planar images;

(b) a computer, said computer comprising means for interleaving the predetermined number of planar images to produce a digital representation of an interleaved image;

(c) means for rotating the digital representation of the interleaved image by a predetermined angle of interleaving such that a selected edge of the rotated interleaved image is substantially unaligned with the direction of the original digital representation prior to rotation;

(d) means for generating a digital representation of a barrier screen with a pitch matching that of the interleaved image;

(e) means for rotating the digital representation of the barrier screen by the predetermined angle of interleaving such that a selected edge of the digital representation of the barrier screen is substantially unaligned with the direction of the original digital representation prior to rotation; and (f) a double-side high-resolution output imaging device, said device being in communication with the computer for printing the rotated interleaved image on a single side of a transparent spacer substrate with a selected edge of the rotated interleaved image being substantially unaligned with both the printing direction of said output imaging device and the normal to said printing direction, said output imaging device comprising means for printing the barrier screen on the reverse side of the spacer substrate with selected edges of the barrier screen being aligned with the selected edge of the interleaved image.

54. The apparatus of claim 53, wherein the generating means comprises a scanner in communication with the computer.

55. The apparatus of claim 53, wherein the generating means comprises a computer program under operator control.

56. The apparatus of claim 53, wherein the generating means comprises a computer program which can accept as input one or more views of a scene and can generate a plurality of different planar views of the scene.

57. The apparatus of claim 53, wherein the generating means comprises a plurality of digital cameras in communication with the computer.

58. The apparatus of claim 53, where a single camera is mounted on a moving track to provide a series of planar images from predetermined viewpoints.

59. The apparatus of claim 53, where a single camera can provide a series of images taken at predetermined times.

60. The apparatus of claim 53, wherein the computer comprises at least one of the means for rotating the interleaved image, the means for generating a digital representation of a barrier screen, and the means for rotating the digital representation of the barrier screen.

61. The apparatus of claim 53, wherein the substrate is 0.0625 inches thick.

62. The apparatus of claim 53, wherein the substrate is 0.03125 inches thick.

63. The apparatus of claim 53, wherein the substrate is 0.250 inches thick.

64. An autostereogram comprising:

(a) an interleaved image comprising a plurality of planar images on a substrate, said interleaved image having been produced by:

(i) inputting the plurality of planar images into a computer, (ii) interleaving the plurality of planar images in the computer to produce a digital representation of the interleaved image, said digital representation having rows and columns, (iii) rotating the digital representation of the interleaved image in the computer by a predetermined angle of interleaving such that a selected edge of the rotated interleaved image is substantially unaligned with the direction of the original digital representation prior to rotation, and (iv) printing the rotated interleaved image on the substrate with a high-resolution output imaging device, such that a selected edge of the rotated interleaved image is substantially unaligned with the printing direction of said output imaging device and also substantially unaligned with the normal to said direction; and (b) means for viewing the interleaved image.

65. The autostereogram of claim 64, wherein the means for viewing comprises a lenticular screen whose pitch matches the pitch of interleaving.

66. The autostereogram of claim 65, wherein the pitch of the lenticular screen is slightly greater than the pitch of the image, so as to provide for parallax correction.

67. The autostereogram of claim 64, wherein the means for viewing comprises a barrier screen, whose pitch matches the pitch of interleaving.

68. The autostereogram of claim 67, wherein the pitch of the barrier screen is slightly greater than the pitch of the image, to provide for parallax correction.

69. The autostereogram of claim 64, wherein the means for viewing comprises a light line source.

70. The autostereogram of claim 69, wherein the pitch of the line light source is slightly less than the pitch of the image, so as to provide for parallax correction.

* * * * *